United States Patent
Abt

(10) Patent No.: US 10,648,166 B2
(45) Date of Patent: May 12, 2020

(54) SCREENING DEVICE

(71) Applicant: HUBER SE, Berching (DE)

(72) Inventor: Simon Abt, Thalmaessing (DE)

(73) Assignee: HUBER SE, Berching (DE)

(*) Notice: Subject to any disclaimer, the term of this patent is extended or adjusted under 35 U.S.C. 154(b) by 0 days.

(21) Appl. No.: 16/078,094

(22) PCT Filed: Feb. 17, 2017

(86) PCT No.: PCT/EP2017/053609
§ 371 (c)(1),
(2) Date: Aug. 21, 2018

(87) PCT Pub. No.: WO2017/144361
PCT Pub. Date: Aug. 31, 2017

(65) Prior Publication Data
US 2019/0085550 A1 Mar. 21, 2019

(30) Foreign Application Priority Data

Feb. 23, 2016 (DE) .................. 10 2016 103 081

(51) Int. Cl.
E03F 5/14 (2006.01)
B01D 29/35 (2006.01)
(Continued)

(52) U.S. Cl.
CPC .............. *E03F 5/14* (2013.01); *B01D 29/35* (2013.01); *B01D 29/445* (2013.01); *B01D 29/6484* (2013.01); *E02B 8/026* (2013.01)

(58) Field of Classification Search
CPC . E03F 5/14; E02B 8/023; E02B 8/026; B01D 29/445; B01D 29/6484
(Continued)

(56) References Cited

U.S. PATENT DOCUMENTS 2,291,121 A * 7/1942 Tolman .................. E02B 8/026
210/162
4,892,652 A * 1/1990 Rudy ..................... B01D 33/50
210/160
(Continued)

FOREIGN PATENT DOCUMENTS

CH 677001 3/1991
CN 201433463 3/2010
(Continued)

OTHER PUBLICATIONS

German Search Report (102016103081.3), dated Oct. 31, 2016.
(Continued)

*Primary Examiner* — Christopher Upton
(74) *Attorney, Agent, or Firm* — Dority & Manning, P.A.

(57) ABSTRACT

A screening device for separating out and removing contaminants from wastewater includes two continuous conveyors, which are mounted with clearance from each other. Each has a drive wheel that is guided on a circular path and includes a fixedly situated bar screen, which includes multiple mutually spaced grating bars for removing contaminants from the wastewater. Each bar screen includes multiple clearing elements, which are connected to the conveyor for removing from the bar screen the contaminants that have been separated out by the bar screen. The bar screen forms a fixed screen surface that extends, in the intended installation position of the screening device, essentially in the flow direction of the wastewater reaching the screening device.

20 Claims, 4 Drawing Sheets

(51) Int. Cl.
*B01D 29/44* (2006.01)
*B01D 29/64* (2006.01)
*E02B 8/02* (2006.01)

(58) Field of Classification Search
USPC .............................. 210/159, 160, 162, 413
See application file for complete search history.

(56) References Cited

U.S. PATENT DOCUMENTS

| | | | | |
|---|---|---|---|---|
| 5,102,536 | A * | 4/1992 | Wiesemann | B01D 33/048 210/159 |
| 5,534,140 | A * | 7/1996 | Brummond | E02B 8/026 210/162 |
| 2003/0132149 | A1 | 7/2003 | Seidl | |
| 2011/0139692 | A1 * | 6/2011 | Heil | B01D 33/333 210/158 |

FOREIGN PATENT DOCUMENTS

| | | |
|---|---|---|
| CN | 201454235 | 5/2010 |
| DE | 2722063 | 11/1978 |
| DE | 4224641 | 4/1993 |
| DE | 10201082629 | 3/2013 |
| DE | 102011082629 | 3/2013 |
| EP | 0358952 | 3/1990 |
| WO | WO 0048705 | 8/2000 |
| WO | WO 03/059487 | 7/2003 |

OTHER PUBLICATIONS

Translation of the IPRP (PCT/EP2017/053609), dated Sep. 7, 2018.
International Search Report (PCT/EP2017/053609), dated May 17, 2017.
Chinese Office Action and Translation, dated Feb. 3, 2020, 9 pages.

* cited by examiner

SCREENING DEVICE

CROSS-REFERENCE TO RELATED APPLICATIONS

This application claims priority to International Application Serial No. PCT/EP2017/053609, filed Feb. 17, 2017, which claims priority to German Application No. 10 2016 103 081.3, filed Feb. 23, 2016. International Application Serial No. PCT/EP2017/053609 is hereby incorporated herein in its entirety for all purposes by this reference.

FIELD OF THE INVENTION

The present invention relates to a screening device for separating out and removing contaminants from wastewater, comprising two continuous drive means which are mounted with clearance from each other, wherein the drive means are guided on a circular path with the aid of at least one drive wheel in each case, comprising a fixedly situated sieve grate which includes multiple mutually spaced grating bars for separating contaminants from the wastewater, and comprising multiple clearing elements, which are connected to the drive means, for removing the contaminants, which have been separated out by the sieve grate, from the sieve grate.

BACKGROUND OF THE INVENTION

Screening devices of this type are sufficiently known from the state of the art and are utilized, for example, for removing coarse screenings (wood, stones, etc.) from wastewater flowing in a sewer. Good separation efficiency and, therefore, the efficiency of the screening device are dependent, in this case, in particular, on the flow conditions of the sewer and the geometry of the screening device.

The sieve grates of known screening devices extend transversely to the flow direction of the wastewater reaching the screening device. Incoming wastewater therefore flows against the sieve grate from the front, wherein the wastewater passes through the sieve grate without greater deflections, i.e., the wastewater essentially retains its flow direction.

Various solutions for achieving a high separation efficiency already exist from the state of the art. For example, the separation efficiency can be increased by reducing the spacing of the grating bars of the sieve grate. It is disadvantageous, however, that the throughput capacity and, therefore, the efficiency of the screening device decrease as a result.

Moreover, the known screening devices have the disadvantage that their screen surface is limited by the cross section of the sewer.

BRIEF OBJECTS AND SUMMARY OF THE INVENTION

The problem addressed by the present invention is therefore that of creating an efficient screening device which advantageously differs from the state of the art.

The problem is solved by a screening device having the features described below.

The invention proposes a screening device for separating out and removing contaminants from wastewater. The screening device comprises at least two continuous drive means which are mounted with clearance from each other. The drive means are guided on a closed loop path with the aid of at least one drive wheel in each case, wherein, as a matter of priority, each drive means is connected to multiple drive wheels. The screening device further comprises a fixedly situated sieve grate which includes multiple mutually spaced grating bars for separating contaminants from the wastewater, wherein the sieve grate forms a screen surface, against which the wastewater flows during the operation of the screening device. Moreover, multiple clearing elements for removing the contaminants separated out by the sieve grate are present and preferably extend between the drive means and are guided on a closed loop path with the aid of the drive means, to which they are connected, and, in doing so, are guided, at least in some areas, along the screen surface formed by the sieve grate.

According to the invention, it is now provided that the sieve grate forms a fixed screen surface which extends, in the intended installation position of the screening device (i.e., in the position it assumes after the installation in a sewer), essentially in the flow direction of the wastewater reaching the screening device. The flow direction is the direction, in this case, which the wastewater has immediately before reaching the screening device or shortly before entry into the screening device. The width of the sewer extends transversely to the flow direction of the wastewater.

The scope of the invention therefore lies in the fact that the screen surface formed by the sieve grate does not extend at a 90° angle with respect to the aforementioned flow direction, as is common in the state of the art. Instead, in the installed state of the screening device, the screen surface extends essentially in the flow direction of the wastewater flowing into the screening device, and therefore the wastewater is laterally deflected when it flows through the openings in the sieve grate (for this purpose, the screening device preferably includes a flow deflector, for example in the form of a barrier wall, which is explained in greater detail further below). The screen surface preferably extends in a longitudinal direct that is parallel to the flow direction, i.e., its horizontally extending width extends exactly in the aforementioned flow direction. Alternatively, deviations of up to 20° are also conceivable, since the screen surface extends essentially in the aforementioned flow direction in this case as well.

The drive wheels are drivable with the aid of a drive of the screening device (e.g., an electric motor), and so the two drive means, which are mounted with the aid of the drive wheels, move along the closed loop path during operation of the screening device. For this purpose, the screening device preferably comprises at least two drive wheels which can rotate about a common rotational axis, wherein each drive wheel of the pair of drive wheels is connected to a separate drive means (the rotational axis within the scope of the present invention is to be understood to be the axis about which the particular drive wheel rotates during operation of the aforementioned drive). Preferably, the screening device comprises several pairs of drive wheels, wherein the rotational axes of the individual pairs of drive wheels preferably extend in parallel to each other.

The drive means are connected to the clearing elements in this case in such a way that, due to a driving of the drive wheels, the clearing elements are moved together with the drive means along the closed loop path. The fixed sieve grate is situated in such a way, in particular between the drive means, that the clearing elements can pass by the sieve grate and remove the contaminants.

Due to the described arrangement, it is possible to nearly arbitrarily select the width of the sieve grate or its screen surface extending in the aforementioned flow direction, combined with an appropriate adaptation of the length of the clearing elements, since these dimensions extend in the flow direction of the wastewater reaching the screening device when installed in the sewer and, therefore, in the longitudinal direction of the sewer. By comparison, the width of the screen surface of known screening devices is limited by the width of the sewer. The width of the sewer, which, in the state of the art, is therefore decisive for the geometry of the entire screening device, therefore no longer acts as a limiting variable with respect to the width of the screen surface in the present invention.

High separation efficiency as well as good throughput capacity can now be achieved, for example, by way of the fact that the spacing between the grating bars is reduced in the flow direction of the wastewater and, simultaneously, the number of grating bars is increased. The length of the clearing elements, which extends essentially in parallel to the rotational axis of the drive wheels, can then be adapted to the width of the sieve grate.

In particular, in the installation position of the screening device, a portion of or preferably all rotational axes of the drive wheels guiding the drive means should also now be oriented essentially in the flow direction of the wastewater reaching the screening device or flowing into the screening device. Preferably, the rotational axes also extend in the horizontal direction.

The closed loop path of the particular drive means also preferably lies in a plane which is oriented essentially transversely to the aforementioned longitudinal flow direction and, in particular, vertically, which is parallel to the gravitational force.

It is an advantage when the screening device includes a frame having an inlet opening for the wastewater. In the intended installation position of the screening device, the inlet opening is situated in front of the sieve grate relative to the flow direction of the wastewater reaching the screening device. The frame is designed in such a way that the flowing wastewater is guided through the inlet opening and against the sieve grate situated therein. The wastewater reaching the screening device is prevented from flowing further by the frame itself. The wastewater can flow through the inlet opening, however, into the screening device and, in doing so, is purposefully guided to the sieve grate. The wastewater can then be discharged through the grating bars, wherein the contaminants in the flow, i.e., carried along by the wastewater, are deposited on the screen surface.

For the rest, it is pointed out here that the sieve grate does not need to be designed as a single piece, but rather can consist of multiple sections which, in turn, can be connected to each other or can also be spaced apart from each other. In addition, the screen surface does not need to be one contiguous area. Rather, the screen surface can also be composed of multiple sections, wherein individual sections can also be separated from each other.

The screening device advantageously comprises a barrier wall on its side positioned opposite the inlet opening. The wastewater and, therefore, the contaminants flowing through the inlet opening into the screening device can be redirected by the barrier wall in such a way that the wastewater impacts the sieve grate and its non-retained portion continues outwardly through the grating bars. The barrier wall preferably extends perpendicularly to the flow direction of the wastewater flowing into the screening device and therefore effectuates a change in the flow direction of the wastewater. The contaminants can be separated out of the wastewater at the grating bars and can be conveyed upward in the direction of a discharge point by way of the circulating clearing elements. The efficiency of the screening device can be positively influenced by a design of this type, since the wastewater is reliably redirected at the barrier wall and is forcibly directed through the sieve grate.

Moreover, it is advantageous when the barrier wall, in the intended installation position of the screening device, extends transversely or obliquely with respect to the flow direction of the wastewater reaching the screening device. The screening device preferably extends, in this case, across the entire width of the sewer, wherein the barrier wall bridges only a portion of the width of the sewer, and so the wastewater, after having passed through the sieve grate, can flow between the barrier wall and the channel wall of the sewer. The approaching wastewater therefore flows through the inlet opening into the screening device. There, the wastewater is redirected by the barrier wall and finally flows through the sieve grate, in order to finally leave the screening device again, wherein contaminants of a certain size and above are retained by the sieve grate.

In particular, it is therefore advantageous when, in the intended installation position of the screening device, the barrier wall is situated downstream from the inlet opening in the flow direction. The contaminated wastewater can flow through the inlet opening into the screening device and can be redirected by the barrier wall. Such an arrangement of the barrier wall relative to the inlet opening makes it possible for the wastewater to be guided in a targeted manner within the screening device.

In the intended installation position of the screening device, the sieve grate advantageously extends between the inlet opening of the frame and the barrier wall relative to the flow direction of the wastewater reaching the screening device. The sieve grate forms an outlet opening of the frame in this case. Wastewater flowing into the inlet opening and being redirected by the barrier wall can therefore emerge from the frame or the screening device exclusively through the sieve grate, i.e., through the openings delimited by the grating bars. Due to the arrangement of the sieve grate in the flow direction of the wastewater, its width can be individually adapted to the required throughput capacity or the separation efficiency. For this purpose, for example, the spacing and/or the number of grating bars and, therefore, the width of the sieve grate can be changed, since this dimension is independent of the cross section of the sewer itself. Preferably, the spacing between the inlet opening and the barrier wall is 1-fold to 1.5-fold the width of the sieve grate. In particular, the inlet opening as well as the barrier wall should directly adjoin the sieve grate.

It is further advantageous when the sieve grate has an essentially U-shape or V-shape as viewed at the inlet opening, i.e., in the flow direction of the wastewater flowing into the screening device. The sieve grate extends at least partially along the closed loop path of the drive means. Therefore, the clearing elements guided on this closed loop path can be guided along the sieve grate and can remove the contaminants. Moreover, the effectively usable surface of the sieve grate can be configured to be relatively large in a structurally simple way. For the rest, the legs of the U-shape or V-shape can be equally long. It is also conceivable that the aforementioned legs extend in parallel. Preferably, the horizontal spacing between the legs increases in the vertical direction upward, however.

It is also advantageous when the sieve grate comprises a screen trough as well as two sieve grate sections adjoining the screen trough on both sides, wherein the screen surface of the screening device is formed by the screen trough and the aforementioned sieve grate sections. The sieve grate is preferably symmetrically designed. The sieve grate can be single-piece or multi-piece in this case, and so the sieve grate can be rapidly and economically repaired for maintenance purposes. In addition, the grating surface can be increased as a result, and so the amount of contaminants that can be separated can be considerably increased, Preferably, the sieve grate consists of three main components, namely the screen trough and the sieve grate sections connected thereto, which are connected to form one unit.

The two sieve grate sections advantageously extend, at least in some areas, in a straight line upward, proceeding from the screen trough.

It is also advantageous when the first sieve grate section extends, starting from the discharge or an upper end section of the sieve grate situated below the discharge, downward to the screen trough. A sheet steel chute, which is preferably formed from at least one metal sheet, is preferably situated between the upper end section of the sieve grate and the discharge. The contaminants are transported by the grating bars in the direction of the upper end section, wherein the wastewater can escape between the grating bars. Subsequently, the contaminants enter the area of the sheet steel chute and are removed from the screening device via the discharge. In this case, the screen trough is advantageously situated in the area of a channel bed of the sewer. It is also advantageous when the second sieve grate section extends upward, proceeding from the screen trough. In this way, it can be guaranteed, even in the case of a high wastewater level, that the contaminants are reliably removed from the wastewater.

Advantageously, the drive means are drive chains, drive belts, or a drive cable. The design of the drive means can be individually adapted to the required properties of the screening device. The drive wheels are to be adapted in accordance with the selection of the drive means.

It is further advantageous when the drive means are guided on the closed loop path with the aid of at least one upper drive wheel in each case. The drive means are moved on their closed loop path with the aid of a drive (e.g., an electric motor) during the operation of the screening device. The drive is preferably situated in the area of the upper drive wheels in this case, and so the sensitive components of the drive are protected against moisture. In particular, the upper drive wheels are located in the area of an upper inflection point of the drive means, in which the drive means undergo a change in direction. Alternatively or additionally, the screening device can comprise yet another pair of drive wheels, which are located below the upper drive wheels and can be indirectly or directly driven by the drive, by way of the drive means. Preferably, the last-mentioned pair of drive wheels is situated in the vertical direction in the area between the screen trough and the upper drive wheels, particularly preferably between the sieve grate and the upper drive wheels. As a result, the aforementioned drive wheels of the screening device are mounted outside the wastewater and are therefore protected against moisture.

Alternatively or additionally, a pair of drive wheels can also be situated in the area of the screen trough, preferably below the screen trough. The guidance of the drive means in the area of the screen trough can also take place by way of a drive guide, however, which can be situated in the area of a channel bed of the sewer. The drive guide is formed, for example, from plastic elements which are assigned to the drive means and are in contact therewith. Moreover, the drive guide can be or include a runner or rail.

Advantageously, in the intended installation position of the screening device, the drive means are situated one behind the other in the flow direction of the wastewater reaching the screening device. The clearing elements connected to the drive means and situated essentially between the drive means therefore extend essentially in parallel to the rotational axis of the drive wheels and, therefore, in the flow direction of the wastewater flowing into the screening device.

BRIEF DESCRIPTION OF THE DRAWINGS

Further advantages of the invention are described in the following exemplary embodiments. Wherein.

It should be noted at the outset that, in figures which show multiple components or sections of the same kind, only one or two of several components (e.g., clearing elements) or sections of the same kind are provided with a reference sign in some cases, for the sake of clarity.

DETAILED DESCRIPTION

Figure 1:
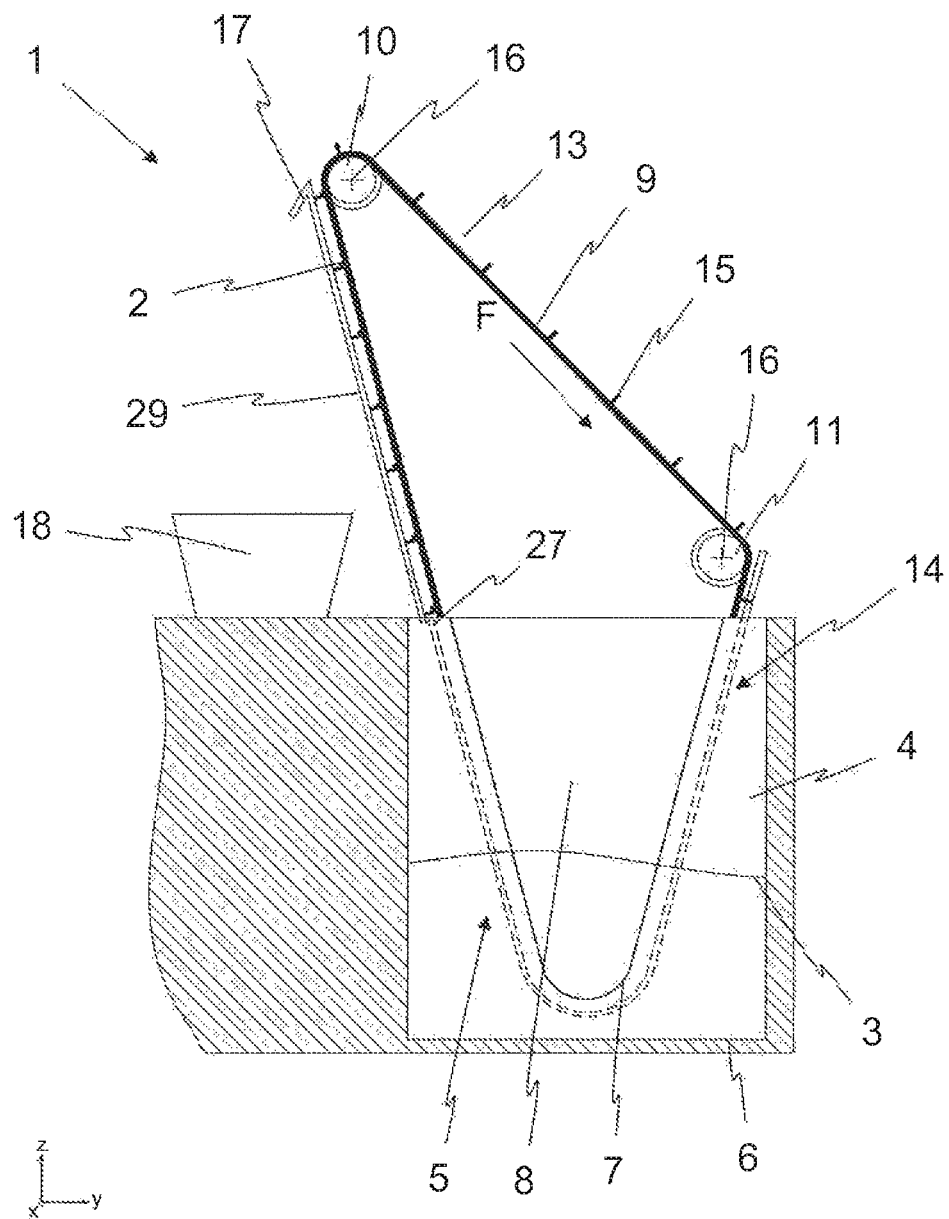
FIG. 1 shows a front view of a screening device according to the invention.
Figure 2:
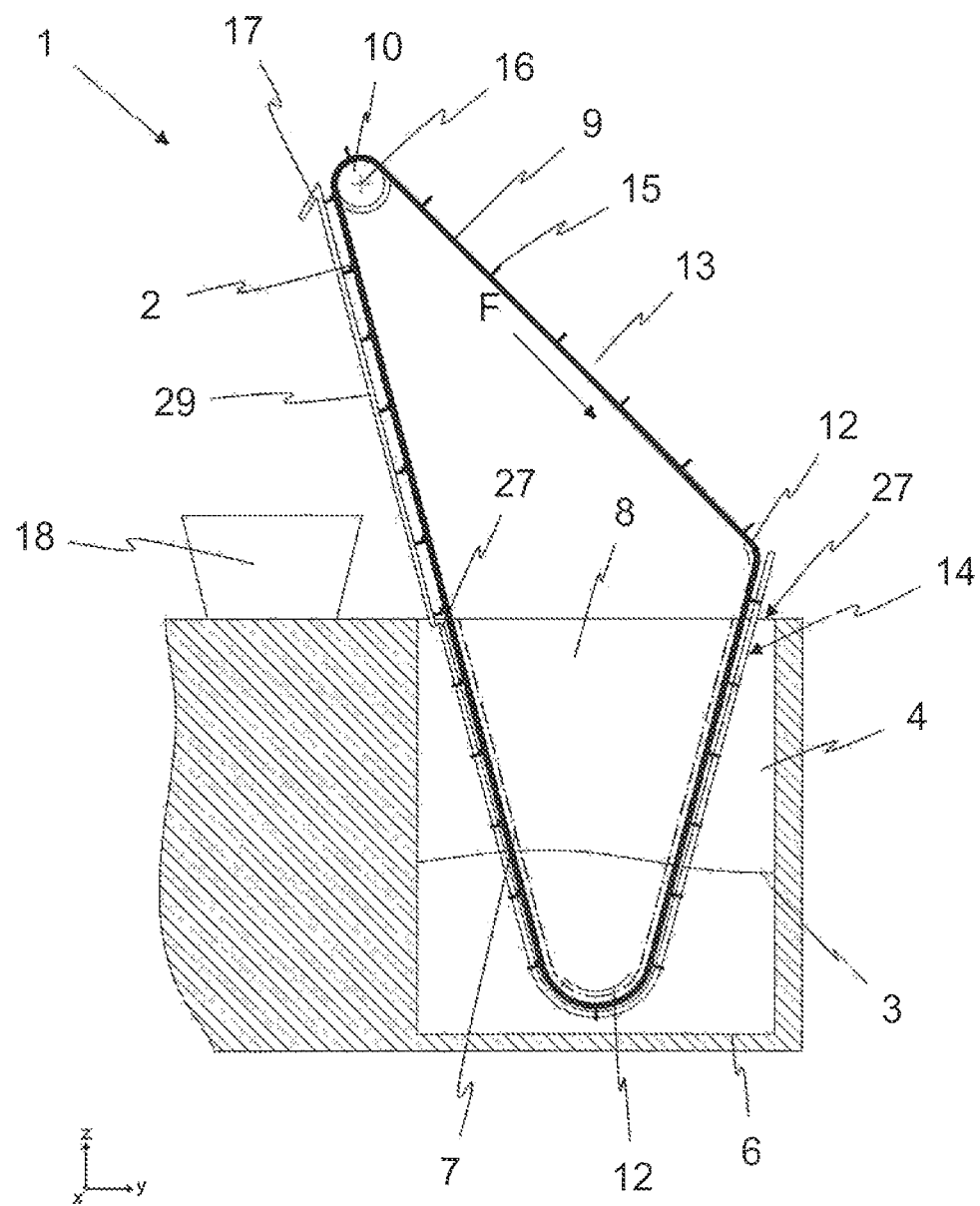
FIG. 2 shows a front view of a screening device according to the invention in a sectional view.
Figure 3:
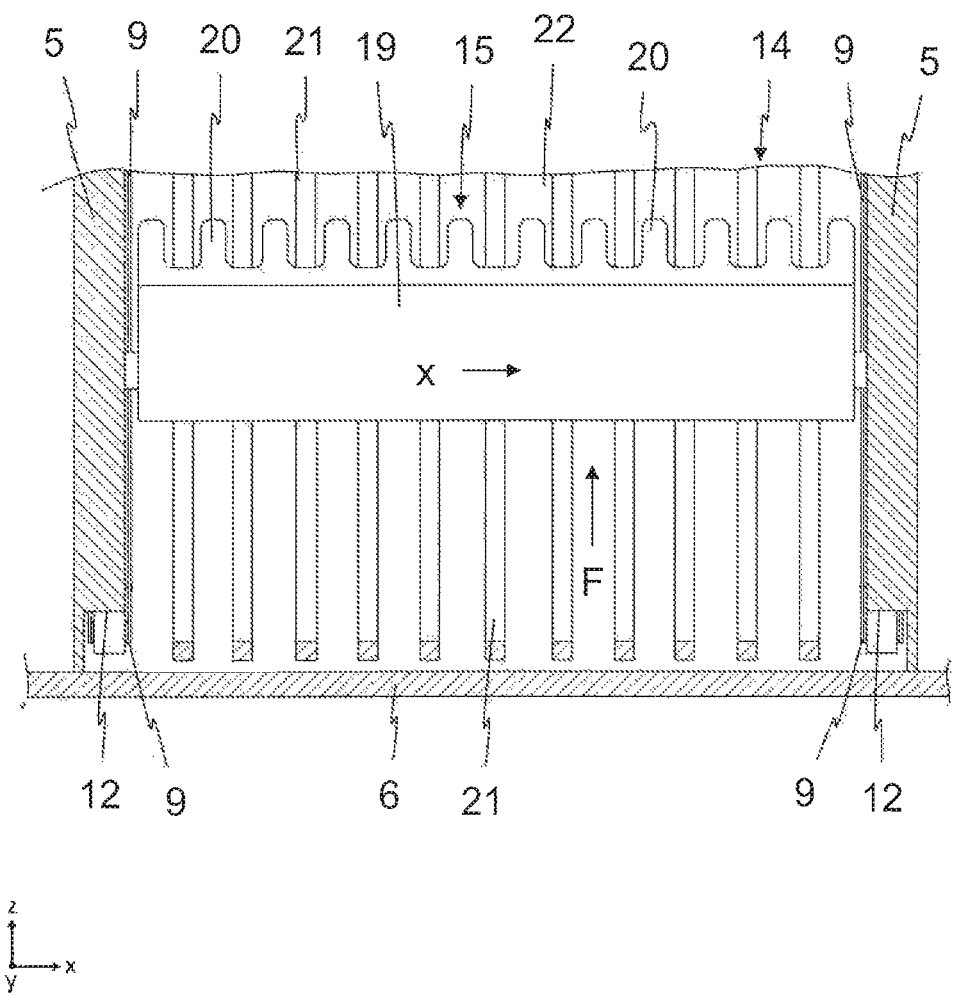
FIG. 3 shows a schematic detail section of a side view of a screening device according to the invention in the area of a drive guide.
Figure 4:
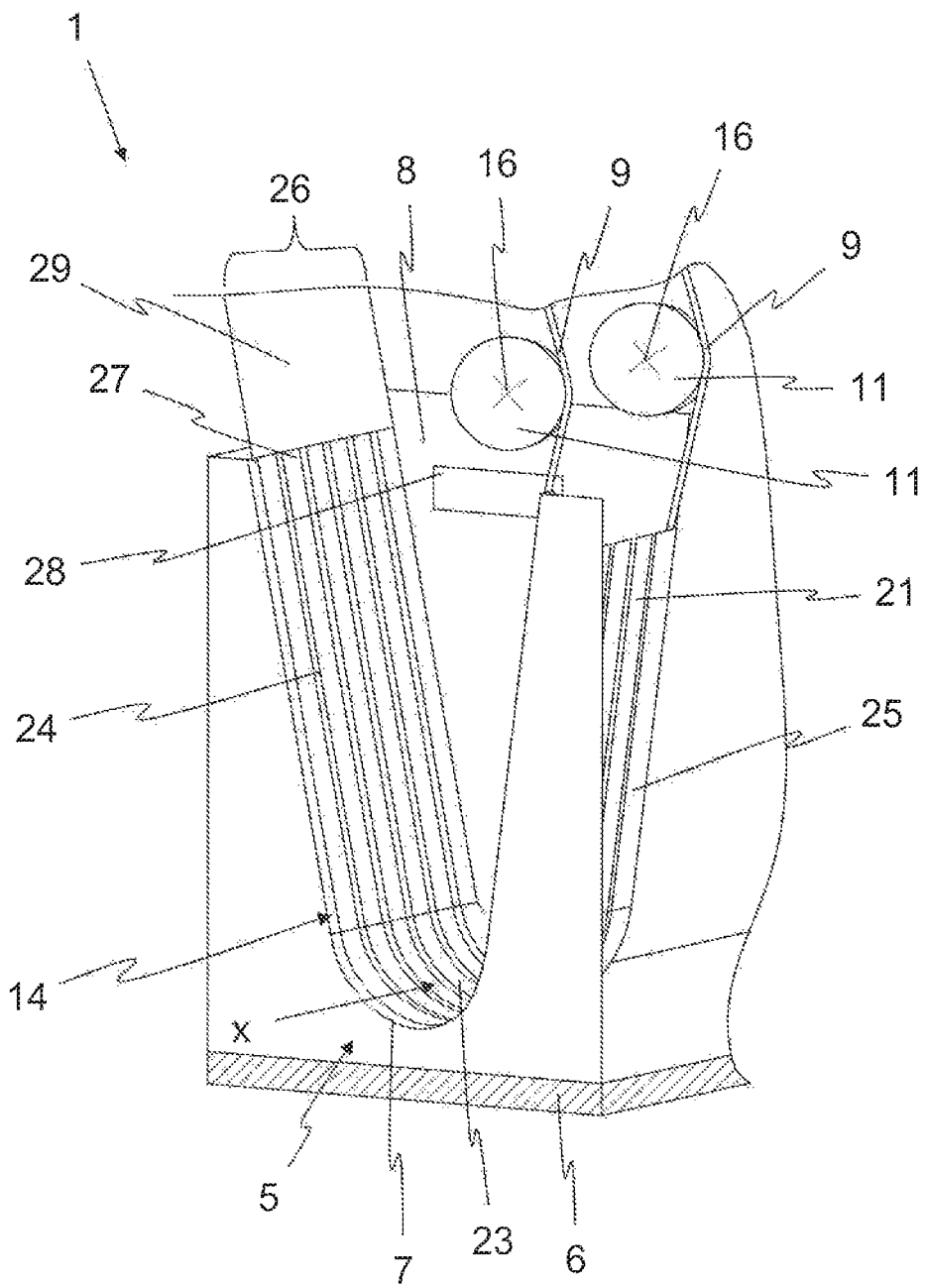
FIG. 4 shows a perspective detail section of a screening device according to the invention.

FIGS. 1 and 2 each show a screening device 1 for separating out and removing contaminants 2, in particular, screenings, from wastewater 3. The screening device 1 is integrated into a sewer 4 and comprises a frame 5, via which the screening device 1 is anchored in the sewer 4. As shown in FIGS. 3 and 4, the frame 5 is connected, for example, to a channel bed 6 of the sewer 4 by way of fastening elements (not shown).

The wastewater 3 can flow into the screening device 1 through the inlet opening 7 defined by the frame 5 at the entrance in the front of the screening device 1. The section of the screening device 1 forming the inlet opening 7 is not shown in FIG. 2, in order to be able to show the sections located therebehind (the inlet opening 7 located in front of the sheet plane is represented by a dashed line). Essentially, however, the section is a wall of the frame 5, which extends in parallel to the sheet plane and is sealingly closed off by the channel bed 6 and the lateral walls of the sewer 4, and so wastewater 3 can flow into the screening device 1 only via the inlet opening 7 (see FIG. 1). The longitudinal flow direction X extends in the x-direction into the sheet plane in this case depicted in FIG. 2.

As shown in FIG. 4, the frame 5 comprises a barrier wall 8 on its side positioned opposite the inlet opening 7 in the longitudinal direction.

Two continuous drive means 9 which are mounted one behind the other in the longitudinal x-direction are situated between the inlet opening 7 and the barrier wall 8. The drive means 9 are guided on a closed loop path 13 with the aid of at least one drive wheel 10 in each case connected to each drive means 9. The guidance takes place along a closed loop path 13 in this case in particular with the aid of an upper drive wheel 10, and preferably also with the aid of a central drive wheel 11 and/or a drive guide 12 (cf. FIG. 2 and FIG. 3). Each continuous drive means 9 is designed as a drive chain, a drive belt, or a drive cable in this case. Correspondingly to the selection of the drive means 9, the drive wheels 10, 11 are then also designed as a sprocket, a belt pulley, or a cable pulley. As an alternative to FIG. 1, the screening device 1 in FIG. 2 is designed to include two upper drive wheels 11 as well as two central and two lower drive guides 12. As shown in FIGS. 2 and 3, each drive guide 12 is preferably a runner or a rail in each of these cases.

Moreover, the screening device 1 shown comprises a U-shaped or V-shaped sieve grate 14 which is situated at least partially between the two drive means 9. Multiple clearing elements 15 are situated between the drive means 9, with the aid of which the contaminants 2 retained by the sieve grate 14 can be removed from the sieve grate 14.

In the installation position of the screening device 1 represented in FIGS. 1 and 2, i.e., in the installation position in the sewer 4, the wastewater 3 flows through the inlet opening 7, in the longitudinal x-direction, into the frame 5, i.e., the longitudinal flow direction X of the wastewater 3 reaching the screening device 1 extends in the x-direction. Since the wastewater 3, after passing through the inlet opening 7, cannot continue to flow in the original longitudinal flow direction X due to the barrier wall 8, the wastewater 3 forcibly passes, in the y-direction, through the sieve grate 14 including its screen surface 26 extending in the aforementioned longitudinal flow direction X. The wastewater 3 therefore flows through the sieve grate 14 and, finally, out of the screening device 1 and back into the sewer 4, wherein contaminants 2 are retained by the sieve grate 14.

The drive wheels 10, 11 can be directly or indirectly rotated with the aid of a drive (not shown), and so the drive means 9 mounted with the aid of the drive wheels 10, 11 move along the closed loop path 13 along a conveyance direction F. The drive wheels 10, 11 preferably rotate about a rotational axis 16 which extends in the longitudinal flow direction X of the wastewater 3 passing through the screening device 1, which is defined by the longitudinal x-direction in FIG. 1.

The clearing elements 15 are operatively connected to the drive means 9 in such a way that the clearing elements 15 are also moved on the circular path 13. In doing so, the clearing elements 15 pass by the sieve grate 14 and remove the contaminants 2 from the sieve grate 14. The clearing elements 15 are designed, in particular, for transporting the contaminants 2 upward in the direction of a discharge 17. From there, the contaminants 2 are conveyed, for example, into a container 18. In addition, a sheet steel chute 29 is situated between the discharge 17 and an upper end section 27 of the sieve grate. The sheet steel chute 29 extends, as an extension of the sieve grate 14, obliquely upward and is designed to be impermeable to water, and so the wastewater 3 can emerge only in the area of the sewer 4, and not across the width thereof of the chute 29.

FIG. 3 shows a schematic detail section of a side view of the screening device 1 according to the invention in the area of a lower drive guide 12. The drive guide 12 is situated in the frame 5 above the channel bed 6. The clearing elements 15 extend in the longitudinal direction between the two drive means 9 in this case. The clearing elements 15 are connected to the drive means 9, and so the clearing elements 15 move together with the drive means 9 in the conveyance direction F. Each clearing element 15 preferably comprises a clearing bar 19 including cleaning tines 20 situated next to each other.

The clearing elements 15 extend in the longitudinal flow direction X of the wastewater 3 in this case. The sieve grate 14 comprises multiple grating bars 21 which correspond to the cleaning tines 20 in such a way that the cleaning tines 20 engage into the channels 22 that are formed between the adjacent grating bars 21 in order to remove the contaminants 2 (cf. FIG. 1 and FIG. 2).

FIG. 4 shows a perspective detail section of the screening device 1. The clearing elements 15 are not shown here, for the sake of clarity. In addition, the drive means 9 are represented only on the right hand side of FIG. 4. The sieve grate 14 is U-shaped or V-shaped and is situated between the inlet opening 7 and the barrier wall 8. The barrier wall 8 also comprises an emergency overflow 28 through an upper region of the barrier wall 8, and so the wastewater 3 can flow out of the screening device 1 through the emergency overflow 28 once a certain wastewater level has been reached or in the event that the screening device becomes clogged due to a malfunction. The sieve grate 14 comprises a screen trough 23, which is a region of the bar screen 14 that is disposed between a first sieve grate section 24, and a second sieve grate section 25. The two sieve grate sections 24, 25 extend essentially in a straight line upward on both sides, proceeding from the screen trough 23.

As is the case with the two sieve grate sections 24, 25, the screen trough 23 also comprises grating bars 21 situated next to each other. The first sieve grate section 24 extends from the upper end section 27 (cf. FIG. 1) to the screen trough 23. The screen trough 23 is held by the frame 5 so that it becomes situated in the area of the channel bed 6 in this case. The second sieve grate section 24 extends upward from the screen trough 23, in particular beyond the anticipated level of the wastewater 3 (cf. FIG. 1). As is clearly apparent here in the view of FIG. 4, each section of the screen surface 26 formed by the screen trough 23 and the remaining sieve grate sections 24, 25 extends in parallel to the longitudinal flow direction X.

The present invention is not limited to the exemplary embodiments which have been represented and described. Modifications within the scope of the claims are also possible, as is any combination of the features, even if they are represented and described in different exemplary embodiments.

LIST OF REFERENCE SIGNS 1 screening device
2 contaminant
3 wastewater
4 sewer
5 frame
6 channel bed
7 inlet opening
8 barrier wall
9 drive means
10 upper drive wheel
11 central drive wheel
12 drive guide
13 circular path
14 sieve grate
15 clearing element
16 rotational axis
17 discharge
18 container
19 clearing bar
20 cleaning tines
21 grating bar
22 opening
23 screen trough
24 first sieve grate section
25 second sieve grate section
26 screen surface
27 upper end section
28 emergency overflow 29 sheet steel chute
F conveyance direction
X flow direction

The invention claimed is:
1. A screening device for separating out and removing contaminants from wastewater comprising:
   a frame including a first side defining a first top and a first bottom that is spaced apart in a vertical direction from the first top, a second side defining a second top and a second bottom that is spaced apart in the vertical direction from the second top, wherein the second side is spaced apart from the first side in a transverse direction, which is normal to the vertical direction;
   a rigid bar screen carried by the frame;
   wherein the rigid bar screen includes a plurality of bar members;
      wherein each of the plurality of bar members is defined by a transition section that is contiguous with and between a first leg section at a first end of the bar member and a second leg section at a second end of the bar member opposite the first end of the bar member, and wherein each bar member is configured so that the first leg section is spaced apart in the transverse direction from the second leg section;
      wherein each of the plurality of bar members is successively spaced apart in a longitudinal direction from each other of the plurality of bar members, wherein the longitudinal direction is normal to both the vertical direction and the transverse direction;
      wherein each adjacent pair of the plurality of bar members defines therebetween an opening in the rigid bar screen, wherein the opening defines a continuous channel between both first leg sections, transition sections and second leg sections of each adjacent pair of the plurality of bar members; and
   a channel clearing mechanism that includes a first continuous drive means and a second continuous drive means spaced apart in the longitudinal direction from the first continuous drive means;
      wherein the channel clearing mechanism includes a plurality of clearing elements connected to the first and second continuous drive means, each clearing element including a plurality of tines disposed in an alignment that is normal to the longitudinal direction, each of the tines in each clearing element being disposed to move within a respective one of the continuous channels of the rigid bar screen and configured for removing the contaminants from the respective one of the continuous channels;
      wherein the channel clearing mechanism includes an upper drive wheel carried by the frame and rotatable about an axis of rotation extending along the longitudinal direction, wherein the upper drive wheel engaging the first continuous drive means and the second continuous drive means to move the first continuous drive means and the second continuous drive means during rotation of the upper drive wheel;
      wherein the channel clearing mechanism includes a first guide disposed near the transition sections of the plurality of bar members and defining a transition guide path therebetween;
      wherein the channel clearing mechanism includes a second guide disposed near the second leg sections of the plurality of bar members and defining a return guide path therebetween, wherein the second guide is disposed spaced apart from both the first guide and the upper drive wheel in both the vertical direction and the transverse direction; and
      wherein the first continuous drive means is disposed to pass through the transition guide path and the return guide path in the course of clearing the continuous channels between both transition sections and second leg sections of each adjacent pair of the plurality of bar members.

2. The screening device as claimed in claim 1, wherein each of the first and second drive wheels is mounted so as to be rotatable about rotational axes, wherein each of the rotational axes extends in the longitudinal direction.

3. The screening device as claimed in claim 1, further comprising a frame carrying the bar screen and defining an inlet opening configured and disposed for receiving wastewater flowing in the longitudinal direction.

4. The screening device as claimed in claim 3, wherein the screening device comprises a barrier wall spaced apart in the longitudinal direction from the inlet opening.

5. The screening device as claimed in claim 4, wherein the barrier wall extends transversely or obliquely to the longitudinal direction.

6. The screening device as claimed in claim 4, wherein the bar screen extends between the inlet opening of the frame and the barrier wall.

7. The screening device as claimed in claim 4, wherein the second continuous drive means is situated closer to the barrier wall than is situated the first continuous drive means.

8. The screening device as claimed in claim 3, wherein the bar screen has an essentially U-shape or V-shape as viewed at the inlet opening.

9. The screening device as claimed in claim 1, wherein each of the continuous drive means is guided with the aid of at least one of: an upper drive wheel, a central drive wheel, or a drive guide.

10. The screening device as claimed in claim 9, wherein each of the continuous drive means is guided with the aid of a runner.

11. The screening device as claimed in claim 9, further comprising:
   a first rail disposed to guide the first continuous drive means; and
   a second rail disposed to guide the second continuous drive means.

12. The screening device as claimed in claim 1, wherein the bar screen comprises a screen trough as well as two bar screen sections, each bar screen section adjoining the screen trough on a respective one of the opposite sides of the screen trough.

13. The screening device as claimed in claim 12, wherein each of the two bar screen sections extends in a straight line, at least along a partial section thereof, and proceeding from the screen trough.

14. The screening device as claimed in claim 12, wherein one of the bar screen sections extends downward from an upper end section to the screen trough, and wherein the other one of the bar screen sections extends upward from the screen trough.

15. The screening device as claimed in claim 1, wherein each of the first and second continuous drive means is selected from the following: drive chains, drive belts, or a drive cable.

16. A screening device as in claim 1, wherein the frame carries the rigid bar screen with transition sections of each of the plurality of bar members disposed between the first top and the first bottom of the frame.

17. A screening device for separating out and removing contaminants from wastewater comprising:
   a frame including a first side defining a first top and a first bottom that is spaced apart in a vertical direction from the first top, a second side defining a second top and a second bottom that is spaced apart in the vertical direction from the second top, wherein the second side is spaced apart from the first side in a transverse direction, which is normal to the vertical direction;
   a rigid bar screen carried by the frame;
   wherein the rigid bar screen includes a plurality of bar members;
      wherein each of the plurality of bar members is defined by a transition section that is contiguous with and between a first leg section at a first end of the bar member and a second leg section at a second end of the bar member opposite the first end of the bar member, and wherein each bar member is configured so that the first leg section is spaced apart in the transverse direction from the second leg section;
      wherein each of the plurality of bar members is successively spaced apart in a longitudinal direction from each other of the plurality of bar members, wherein the longitudinal direction is normal to both the vertical direction and the transverse direction;
      wherein each adjacent pair of the plurality of bar members defines therebetween an opening in the rigid bar screen, wherein the opening defines a continuous channel between both first leg sections, transition sections and second leg sections of each adjacent pair of the plurality of bar members; and
   a channel clearing mechanism that includes a first continuous drive means and a second continuous drive means spaced apart in the longitudinal direction from the first continuous drive means;
      wherein the channel clearing mechanism includes a plurality of clearing elements connected to the first and second continuous drive means, each clearing element including a plurality of tines disposed in an alignment that is normal to the longitudinal direction, each of the tines in each clearing element being disposed to move within a respective one of the continuous channels of the rigid bar screen and configured for removing the contaminants from the respective one of the continuous channels;
      wherein the channel clearing mechanism includes an upper drive wheel carried by the frame and rotatable about an axis of rotation extending along the longitudinal direction, wherein the upper drive wheel engaging the first continuous drive means and the second continuous drive means to move the first continuous drive means and the second continuous drive means during rotation of the upper drive wheel;
      wherein the channel clearing mechanism includes a first guide disposed near the transition sections of the plurality of bar members and defining a transition guide path therebetween; and
      wherein the first continuous drive means is disposed to pass through the transition guide path in the course of clearing the continuous channels between both transition sections and second leg sections of each adjacent pair of the plurality of bar members.

18. A screening device as in claim 17, wherein the channel clearing mechanism includes a central drive wheel disposed near the second leg sections of the plurality of bar members and defining a return guide path therebetween, wherein the central drive wheel is disposed spaced apart from both the first guide and the upper drive wheel in both the vertical direction and the transverse direction, and wherein the first continuous drive means is disposed to pass through the transition guide path and the return guide path in the course of clearing the continuous channels between both transition sections and second leg sections of each adjacent pair of the plurality of bar members.

19. A screening device as in claim 17, wherein the frame carries the rigid bar screen with transition sections of each of the plurality of bar members disposed between the first top and the first bottom of the frame.

20. A screening device as in claim 17, wherein each bar member is configured so that the first leg section elongates at an acute angle with respect to the second leg section.

* * * * *